(12) United States Patent
Lin (10) Patent No.: US 10,712,531 B2
(45) Date of Patent: Jul. 14, 2020

(54) LENS STRUCTURE AND ASSEMBLY METHOD THEREOF

(71) Applicant: LUXVISIONS INNOVATION LIMITED, New Territories OT (HK)

(72) Inventor: Jyun-Jie Lin, Taipei (TW)

(73) Assignee: LUXVISIONS INNOVATION LIMITED, New Territories (HK)

( * ) Notice: Subject to any disclaimer, the term of this patent is extended or adjusted under 35 U.S.C. 154(b) by 127 days.

(21) Appl. No.: 15/933,387

(22) Filed: Mar. 23, 2018

(65) Prior Publication Data

US 2018/0348471 A1 Dec. 6, 2018

Related U.S. Application Data

(60) Provisional application No. 62/516,075, filed on Jun. 6, 2017.

(30) Foreign Application Priority Data

Oct. 12, 2017 (CN) .......................... 2017 1 0946181

(51) Int. Cl.
   *G02B 7/10* (2006.01)
   *G02B 15/14* (2006.01)
   *G02B 7/02* (2006.01)

(52) U.S. Cl.
   CPC .............. *G02B 7/10* (2013.01); *G02B 7/022* (2013.01); *G02B 15/14* (2013.01)

(58) Field of Classification Search
   CPC ... G02B 7/00; G02B 7/10; G02B 7/02; G02B 7/022; G02B 7/025; G02B 7/026; G02B 15/14; G03B 3/10; G03B 17/12

USPC ....... 359/694, 611, 808, 811, 819, 826, 827, 359/820, 703, 704, 740
See application file for complete search history.

(56) References Cited

U.S. PATENT DOCUMENTS

| 5,831,777 A * | 11/1998 | Iwasa ........................ G02B 7/10 359/826 |
| 7,430,368 B2 * | 9/2008 | Lee ........................ G02B 13/009 348/240.99 |
| 7,545,590 B2 * | 6/2009 | Chang .................... G02B 7/025 359/826 |
| 7,961,411 B2 | 6/2011 | Lee |
| 2012/0288272 A1 * | 11/2012 | Pavithran ............... G03B 17/12 396/529 |

(Continued)

FOREIGN PATENT DOCUMENTS

| CN | 101196603 | 6/2008 |
| CN | 101571617 | 11/2009 |

(Continued)

OTHER PUBLICATIONS

"Office Action of Taiwan Counterpart Application", dated Oct. 18, 2018, p. 1-p. 5.

(Continued)

*Primary Examiner* — Jie Lei
(74) *Attorney, Agent, or Firm* — JCIPRNET (57) ABSTRACT

A lens structure includes a lens barrel and a lens. The lens barrel includes at least two first locking structures. The lens is disposed in the lens barrel and includes at least two second locking structures. The first locking structures are respectively locked to the second locking structures, so that the lens is fixed to the lens barrel.

7 Claims, 11 Drawing Sheets

(56) References Cited

U.S. PATENT DOCUMENTS

2014/0104567 A1  4/2014  Wiand

FOREIGN PATENT DOCUMENTS

| | | |
|---|---|---|
| CN | 204086718 | 1/2015 |
| CN | 103217770 | 6/2015 |
| CN | 102866563 | 12/2015 |
| JP | 2007187776 | 7/2007 |
| JP | 2016184083 | 10/2016 |
| TW | I456281 | 10/2014 |

OTHER PUBLICATIONS

"Office Action of China Counterpart Application", dated May 8, 2020, p. 1-p. 6.

\* cited by examiner

LENS STRUCTURE AND ASSEMBLY METHOD THEREOF

CROSS-REFERENCE TO RELATED APPLICATION

This application claims the priority benefits of U.S. provisional application Ser. No. 62/516,075, filed on Jun. 6, 2017, and China application serial no. 201710946181.0, filed on Oct. 12, 2017. The entirety of each of the above-mentioned patent applications is hereby incorporated by reference herein and made a part of this specification.

BACKGROUND

Technical Field

The disclosure relates to an optical structure and an assembly method thereof; more particularly, the disclosure relates to a lens structure and an assembly method thereof.

Description of Related Art

In a conventional lens structure, a lens barrel and a lens are fixed mainly through an adhesive, wherein an inclined surface of the lens and the lens barrel defines the position of an adhesive groove, and the adhesive is located in the adhesive groove. The position where the lens barrel and the lens is adhered to each other does not occupy a significant area, and thus the adhesion between the lens barrel and the lens is not satisfactory, which poses a negative impact on the structural strength of the lens structure. In addition, after conducting a reliability test, one of the potential risks is the issue of adhesive crack, and the use of adhesives being directly fixed to the lens barrel and the lens may easily lead to shift of the lens in an optical axis direction and further affect the imaging quality.

SUMMARY

The disclosure provides a lens structure with favorable structural strength and imaging quality.

The disclosure also provides an assembly method of a lens structure with satisfactory assembly yield.

In an embodiment of the invention, a lens structure including a lens barrel and a lens is provided. The lens barrel includes at least two first locking structures. The lens is disposed in the lens barrel and includes at least two second locking structures. The first locking structures are respectively locked to the second locking structures, so that the lens is fixed to the lens barrel.

According to an embodiment of the invention, the lens has a first upper surface, a first side surface, at least two protrusions, a second side surface, and a second upper surface. The first side surface is vertically connected to the first upper surface. Each of the protrusions has an inclined surface and a bottom surface. The inclined surface inclines downwardly from the first side surface to a side away from the first side surface, and the second side surface is vertically connected between the bottom surface and the second upper surface. The protrusions and the second upper surface define the second locking structures, so that the second locking structures of the lens are rotatably locked to the first locking structures of the lens barrel from bottom to top.

According to an embodiment of the invention, one of the first locking structures and the second locking structures is a bump, and the other of the first locking structures and the second locking structures is a groove.

According to an embodiment of the invention, the lens further includes a fool-proof notch located on the first upper surface of the lens.

According to an embodiment of the invention, the lens structure further includes an adhesive at least disposed between the lens and the lens barrel.

In an embodiment of the invention, an assembly method of a lens structure includes following steps. A lens barrel and a lens are provided. The lens barrel includes at least two first locking structures, and the lens includes at least two second locking structures. The lens is arranged to pass the lens barrel from bottom to top and to be disposed in the lens barrel. The lens is rotated, such that the first locking structures are respectively locked to the second locking structures, and the lens is fixed to the lens barrel.

According to an embodiment of the invention, after the lens is rotated, the assembly method further includes filling a space between the lens and the lens barrel with an adhesive and curing the adhesive.

According to an embodiment of the invention, after the lens is rotated, the assembly method further includes measuring an optical performance parameter of the lens through an optical instrument and adjusting a rotation angle of the lens according to the optical performance parameter.

According to an embodiment of the invention, the lens has a first upper surface, a first side surface, at least two protrusions, a second side surface, and a second upper surface. The first side surface is vertically connected to the first upper surface. Each of the protrusions has an inclined surface and a bottom surface. The inclined surface inclines downwardly from the first side surface to a side away from the first side surface, and the second side surface is vertically connected between the bottom surface and the second upper surface. The protrusions and the second upper surface define the second locking structures, so that the second locking structures of the lens are rotatably locked to the first locking structures of the lens barrel from bottom to top.

According to an embodiment of the invention, one of the first locking structures and the second locking structures is a bump, and the other of the first locking structures and the second locking structures is a groove.

According to an embodiment of the invention, the lens further includes a fool-proof notch located on the first upper surface of the lens.

In view of the above, in the design of the lens structure, the lens barrel includes the first locking structures, and the lens is disposed in the lens barrel and includes the second locking structures. The first locking structures are respectively locked to the second locking structures, so that the lens is fixed to the lens barrel. As such, the lens structure provided in the disclosure may have favorable structural strength and imaging quality.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
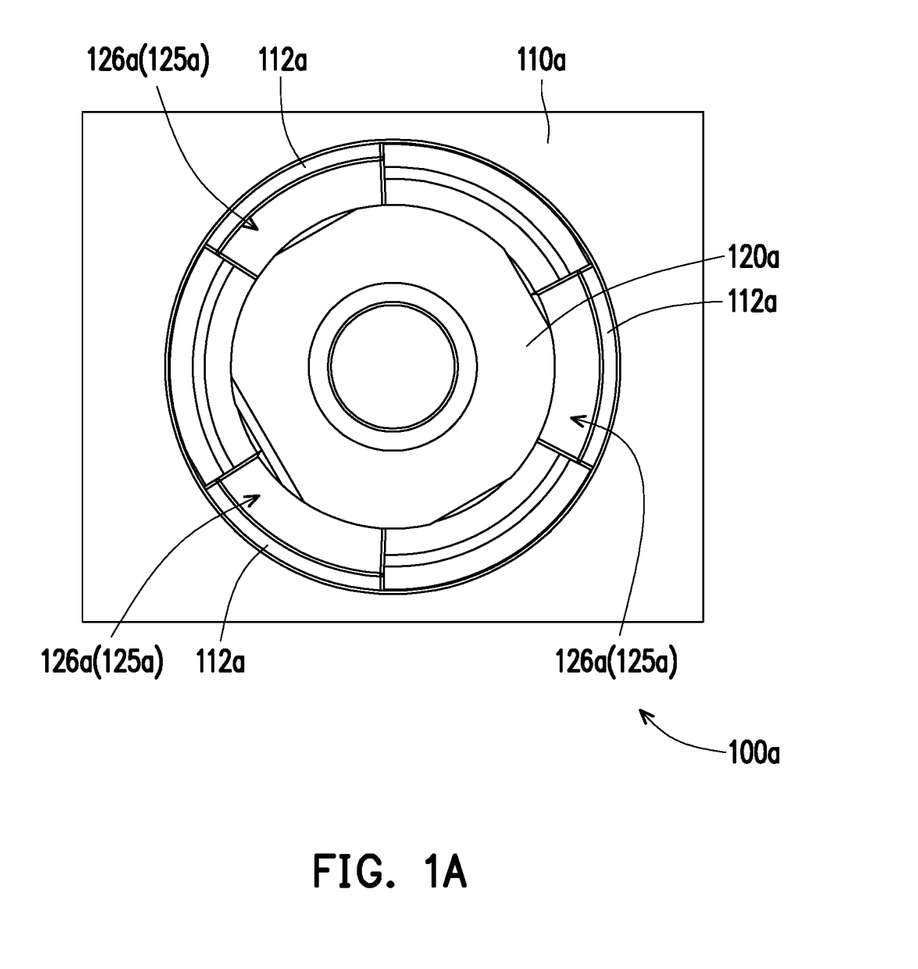
FIG. 1A is a schematic top view of a lens structure according to an embodiment of the invention.
Figure 1B:
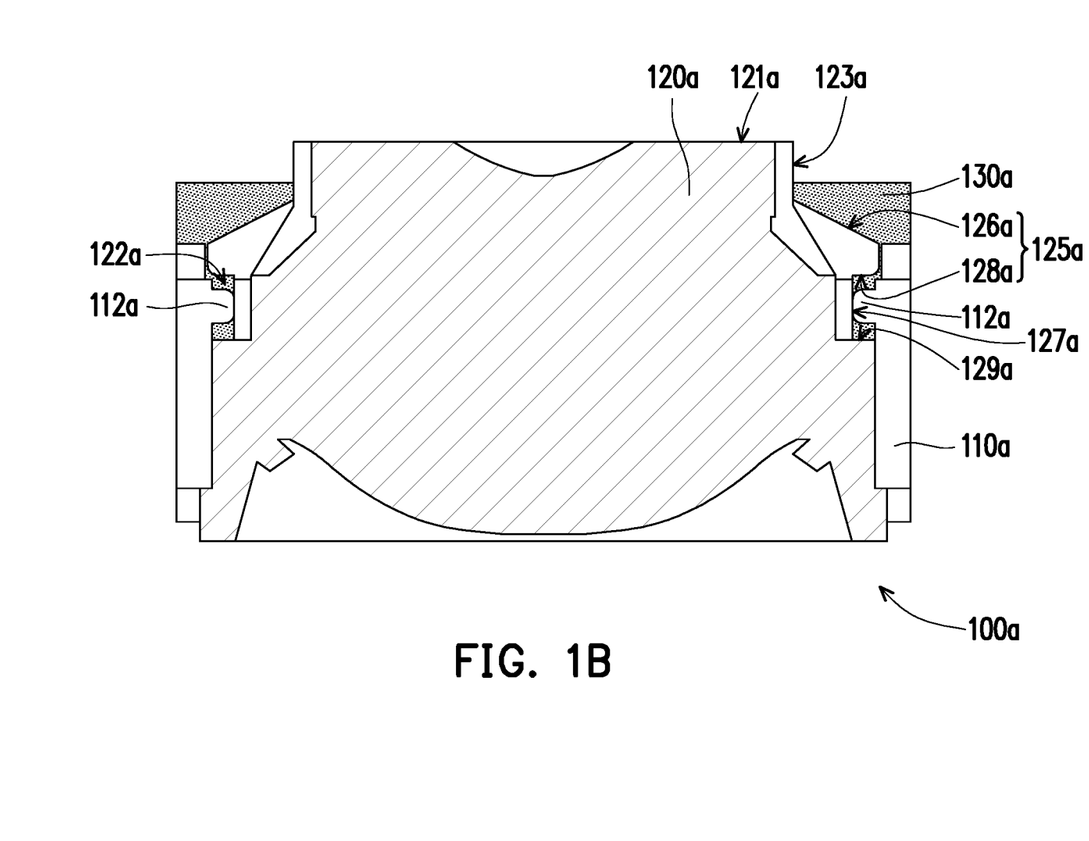
FIG. 1B is a schematic cross-sectional view of the lens structure depicted in FIG. 1A.
Figure 1C:
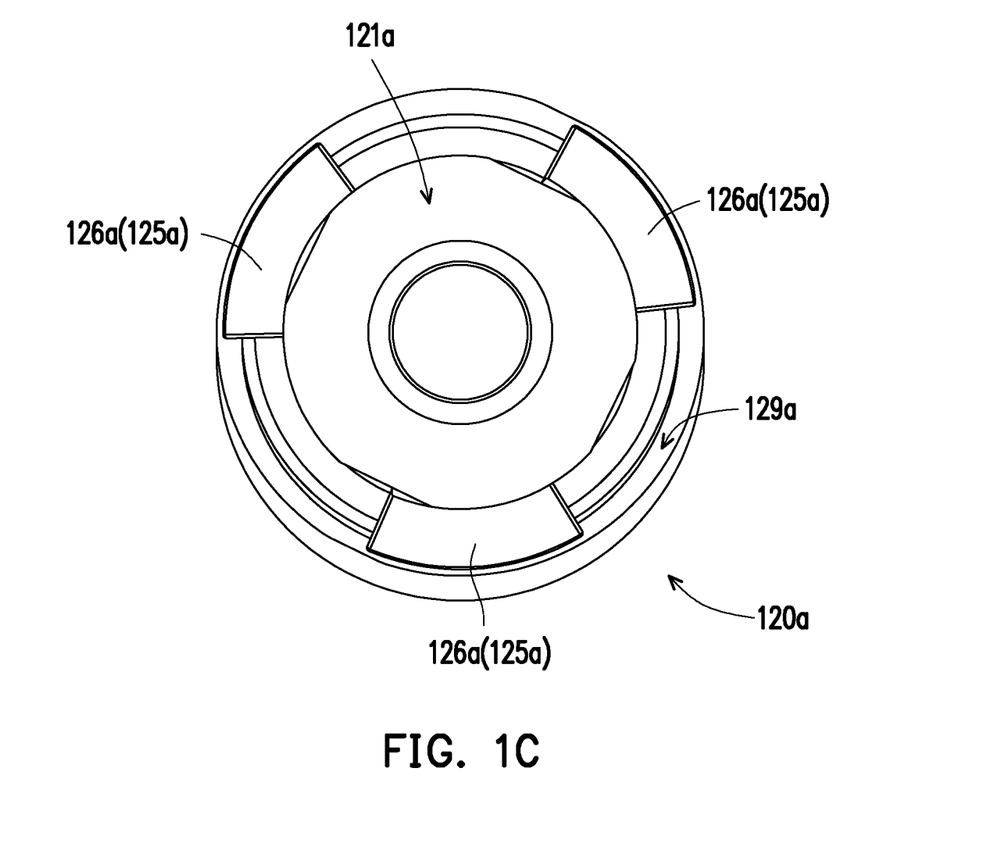
FIG. 1C is a schematic three-dimensional top view of the lens of the lens structure depicted in FIG. 1A.
Figure 1D:
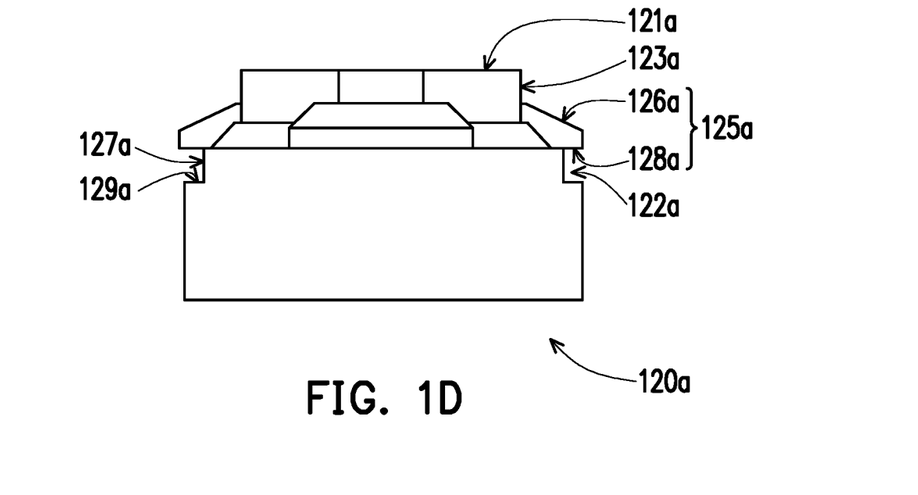
FIG. 1D is a schematic three-dimensional side view of the lens of the lens structure depicted in FIG. 1A.
Figure 1E:
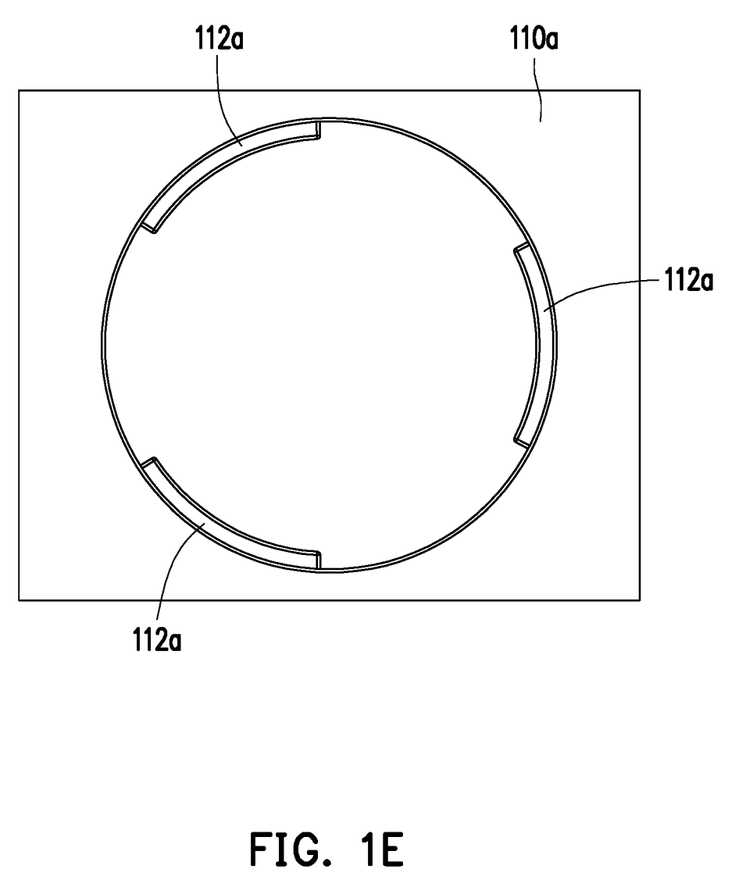
FIG. 1E is a schematic top view of the lens barrel of the lens structure depicted in FIG. 1A.

FIG. 1A is a schematic top view of a lens structure according to an embodiment of the invention. FIG. 1B is a schematic cross-sectional view of the lens structure depicted in FIG. 1A. FIG. 1C is a schematic three-dimensional top view of the lens of the lens structure depicted in FIG. 1A. FIG. 1D is a schematic three-dimensional side view of the lens of the lens structure depicted in FIG. 1A. FIG. 1E is a schematic top view of the lens barrel of the lens structure depicted in FIG. 1A.

With reference to FIG. 1A and FIG. 1B, in the present embodiment, the lens structure 100a includes a lens barrel 110a and a lens 120a. The lens barrel 110a includes at least two first locking structures 112a. The lens 120a is disposed in the lens barrel 110a and includes at least two second locking structures 122a. The first locking structures 112a are respectively locked to the second locking structures 122a, so that the lens 120a is fixed to the lens barrel 110a. Particularly, the second lens structures 122a of the lens 120a provided in the present embodiment are rotatably locked to the first locking structures 112a of the lens barrel 110a from bottom to top.

To be specific, with reference to FIG. 1B and FIG. 1E, the lens barrel 110a provided in the embodiment includes three first locking structures 112a. Herein, the first locking structures 112a are embodied as bumps, and the first locking structures 112a and the lens barrel 110a may be integrally formed, which should however not be construed as limitations in the disclosure.

With reference to FIG. 1B, FIG. 1C, and FIG. 1D, the lens 120a provided in the present embodiment is embodied as a cylindrical lens and has a first upper surface 121a, a first side surface 123a, at least two protrusions 125a, a second side surface 127a, and a second upper surface 129a. The first side surface 123a is vertically connected to the first upper surface 121a. Each of the protrusions 125a has an inclined surface 126a and a bottom surface 128a. The inclined surface 126a incline downwardly from the first side surface 123a to a side away from the first side surface 123a, and the second side surface 127a is vertically connected between the bottom surface 128a and the second upper surface 129a. The protrusions 125a and the second upper surface 129a define the second locking structures 122a. Herein, the second locking structures 122a are embodied as grooves, and the number of the second locking structures 122a correspond to the number of the first locking structures 112a and is three, which should however not be construed as limitations in the disclosure.

It is worth mentioning that although the first locking structures 112a of the lens barrel 110a are embodied as the bumps, and the second locking structures 122a of the lens 120a are embodied as the grooves, the disclosure is not limited thereto. In other embodiments not shown in the drawings, the first locking structures of the lens barrel may be the grooves, and the second locking structures of the lens may be the bumps, which do not depart from the scope of protection provided herein.

Additionally, to further fix the lens 120a and the lens barrel 110a, the lens structure 100a provided in the present embodiment may further include an adhesive 130a at least disposed between the lens 120a and the lens barrel 110a, so as to provide an adhesion force between the lens 120a and the lens barrel 110a. Herein, the adhesive 130a is, for instance, a heat-curing adhesive, such as an ultraviolet adhesive, and may be cured by light; however, the disclosure is not limited thereto.

With reference to FIG. 1B, the first locking structures 112a of the lens barrel 110a provided in the present embodiment respectively interfere with (e.g., locked to) the second locking structures 122a of the lens 120a, so that the lens 120a is fixed to the lens barrel 110a. According to the related art, an adhesive groove is filled with the adhesive to fix the lens onto the lens barrel. By comparison, the lens 120a and the lens barrel 110a of the lens structure 100a provided in the present embodiment are not directly adhered to each other; instead, the lens 120a and the lens barrel 110a are preliminarily fixed to each other by rotatable locking structures, and the space between the lens 120a and the lens barrel 110a is filled with the adhesive 130a, so as to adhere the lens 120a and the lens barrel 110a. Thereby, the lens structure 100a provided in the present embodiment has favorable structural strength and reliability. The adhesive 130a in the first locking structures 112a and the second locking structures 122a is able to absorb a colliding force between the lens 120a and the lens barrel 110a, so as to effectively prevent the issue of adhesive crack.

Figure 2A:
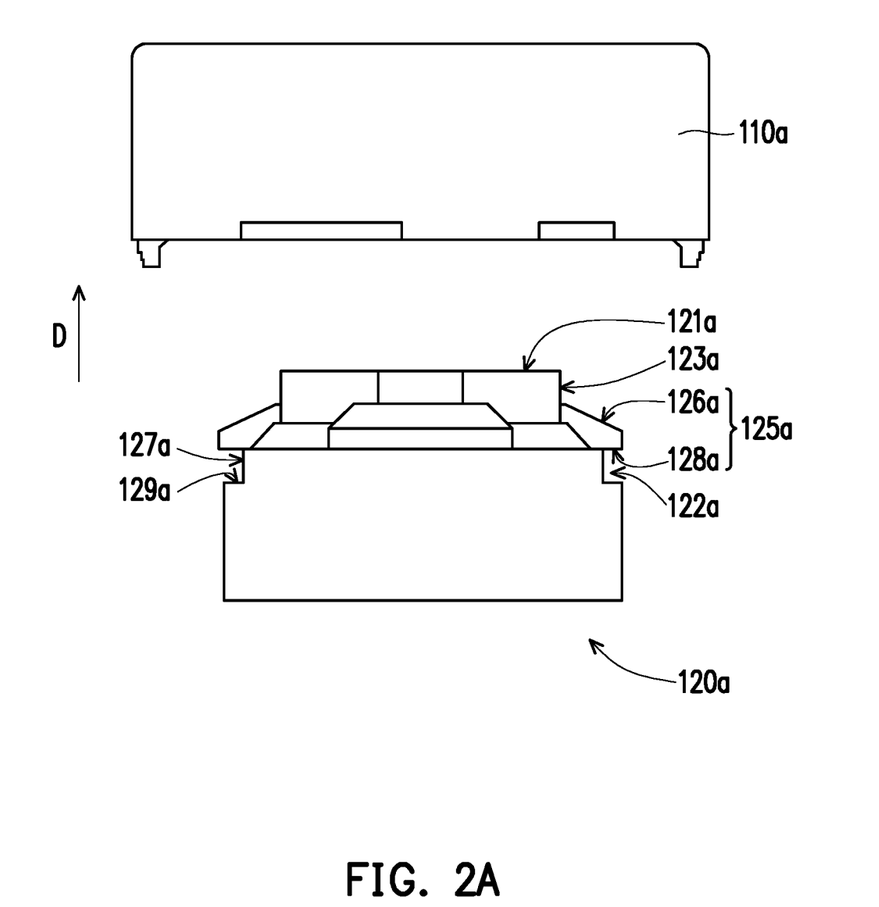
FIG. 2A to FIG. 2E are schematic flowcharts of an assembly method of the lens structure depicted in FIG. 1A.
Figure 2B:
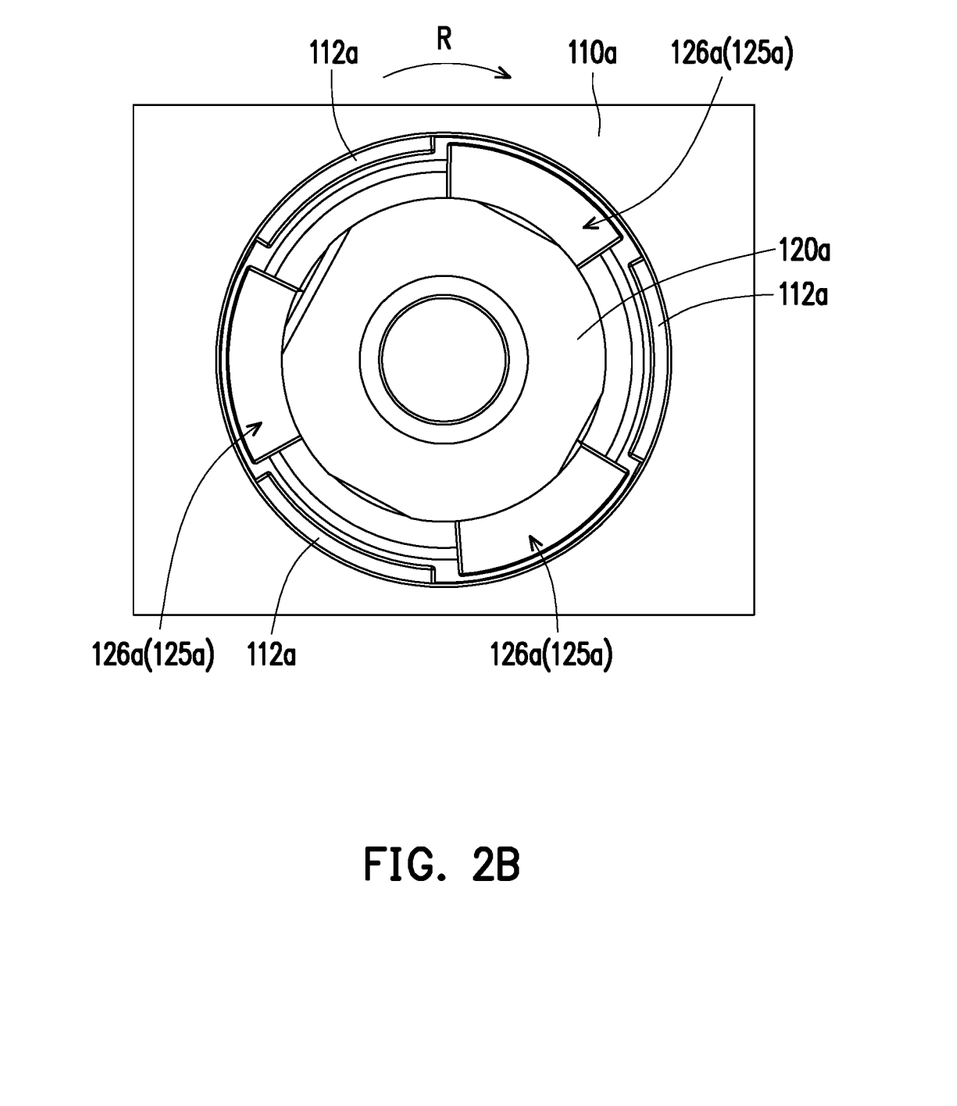
Figure 2C:
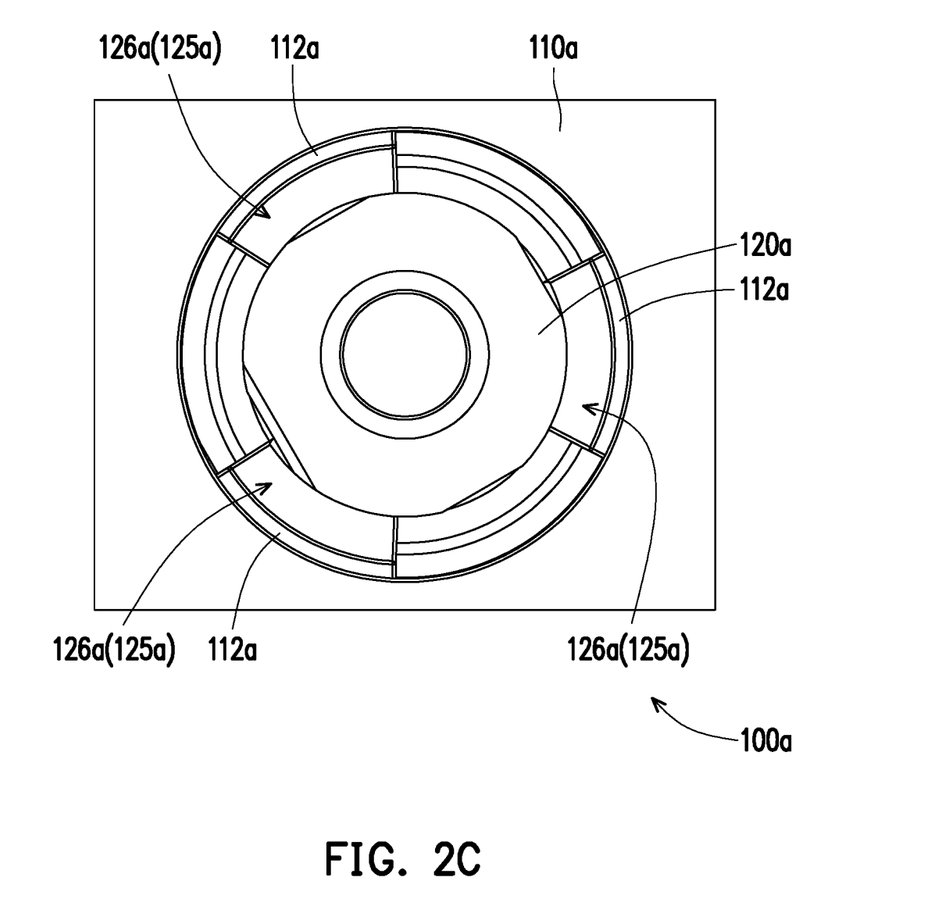
Figure 2D:
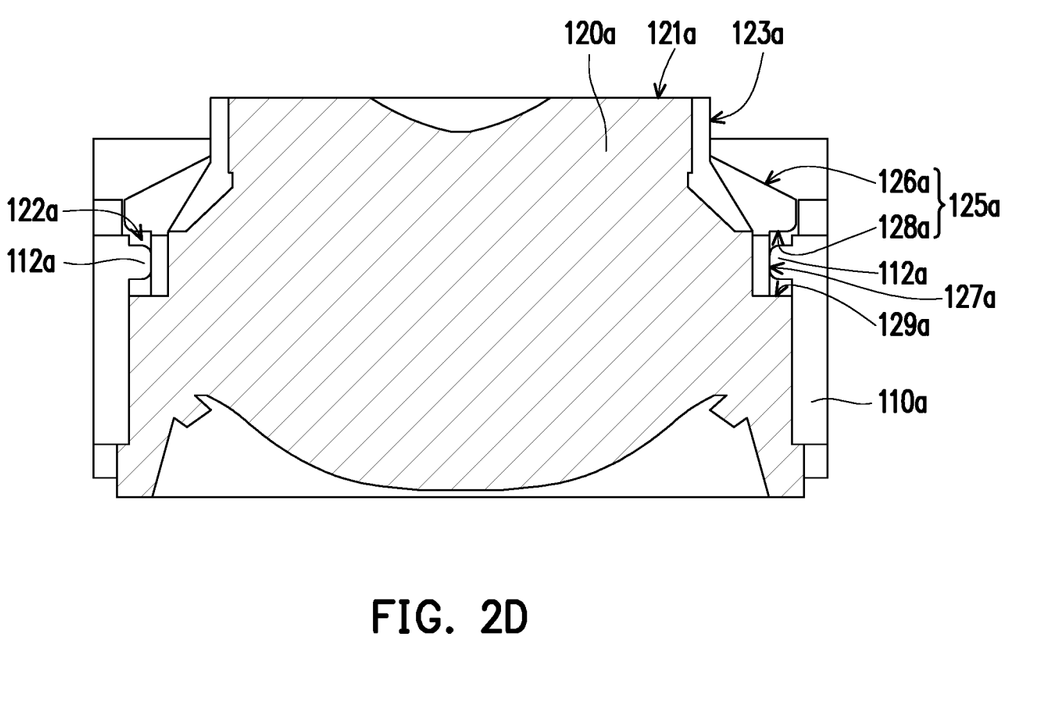
Figure 2E:
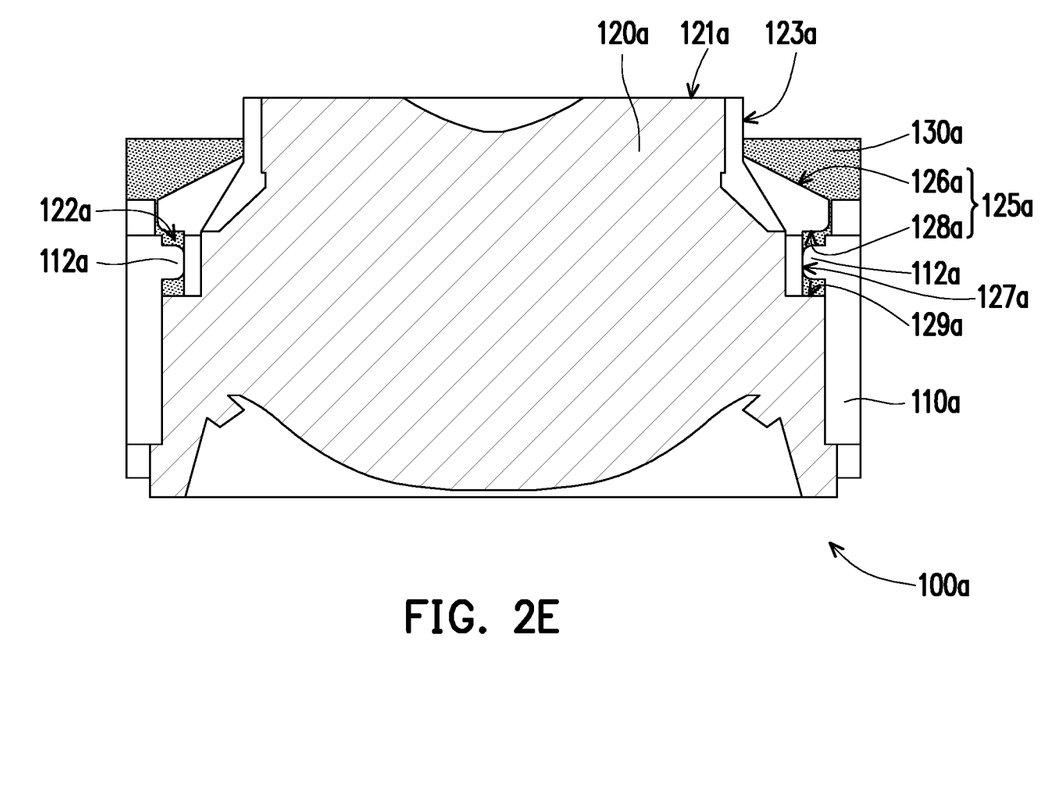

FIG. 2A to FIG. 2E are schematic flowcharts of an assembly method of the lens structure depicted in FIG. 1A. For illustrative and explanatory purposes, note that FIG. 2A is a schematic side view, FIG. 2B and FIG. 2C are schematic top views, and FIG. 2D and FIG. 2E are schematic cross-sectional views.

With reference to FIG. 1C and FIG. 1E, to assemble the lens structure 100a, the lens barrel 110a and the lens 120a are provided. Herein, the lens barrel 110a includes three first locking structures 112a, and the lens 120a includes three second locking structures 122a.

With reference to FIG. 2A and FIG. 2B, the lens 120a is arranged to pass the lens barrel 110a from bottom to top and to be disposed in the lens barrel 110a. That is, the lens 120a is assembled upwardly along a direction D from the bottom of the lens barrel 110a. Herein, the first locking structures 112a of the lens barrel 110a and the second locking structures 122a of the lens 120a do not interfere with each other, i.e., these locking structures 112a and 122a are misaligned.

With reference to FIG. 2B, FIG. 2C, and FIG. 2D, the lens 120a is rotated along a direction R, such that the first locking structures 112a are respectively locked to the second locking structures 122a, and the lens 120a is fixed to the lens barrel 110a. Specifically, the lens 120a may be rotated manually or mechanically along a Z-axis direction, such that the first locking structures 112a of the lens barrel 110a respectively interfere with the second locking structures 122a of the lens 120a, and the lens 120a is fixed onto the lens barrel 110a. In other words, the second locking structures 122a of the lens 120a are rotatably locked to the first locking structures 112a of the lens barrel 110a from bottom to top, and the lens 120a and the lens barrel 110a are preliminarily fixed to each other by the rotatable locking structures.

After that, to ensure the imaging quality of the lens structure 100a, an optical performance parameter of the lens 120a may be measured through an optical instrument, and a rotation angle of the lens 120a may be adjusted according to the optical performance parameter. It should be mentioned that a space (e.g., 0.2 mm) may be preserved between the first locking structures 112a and the second locking structures 122a, so that the lens 120a is allowed to adjust the imaging quality through rotation.

With reference to FIG. 2E, the space between the lens 120a and the lens barrel 110a is filled with the adhesive 130a, which is, for instance, a heat-curing adhesive (e.g., an ultraviolet adhesive). The adhesive 130a is then cured by light, so as to complete the assembly of the lens structure 100a.

In short, the lens structure 100a provided in the present embodiment is not assembled through direction adhesion; instead, the lens 120a and the lens barrel 110a are preliminarily fixed by rotatable locking structures. Users then adjust the best angle of the lens 120a with respect to the lens barrel 110a (i.e., obtain the optimal optical parameter); after the rotation angle is determined, the adhesive 130a is provided for adhesion. Namely, before the space between the lens 120a and the lens barrel 110a is filled with the adhesive 130a, the optimal optical parameter of the lens 120a is already adjusted and set up, and the lens 120a and the lens barrel 110a are then adhered and fixed to each other by the adhesive 130a disposed between the lens 120a and the lens barrel 110a. As such, the lens structure 100a provided in the present embodiment has favorable structural strength and reliability.

The reference numbers and some descriptions provided in the previous embodiments are used in the following embodiment, and the same reference numbers serve to represent the same or similar devices. In the following embodiment, the description of the same technical contents is omitted. Reference may be made to the foregoing embodiments for the omitted descriptions.

Figure 3:
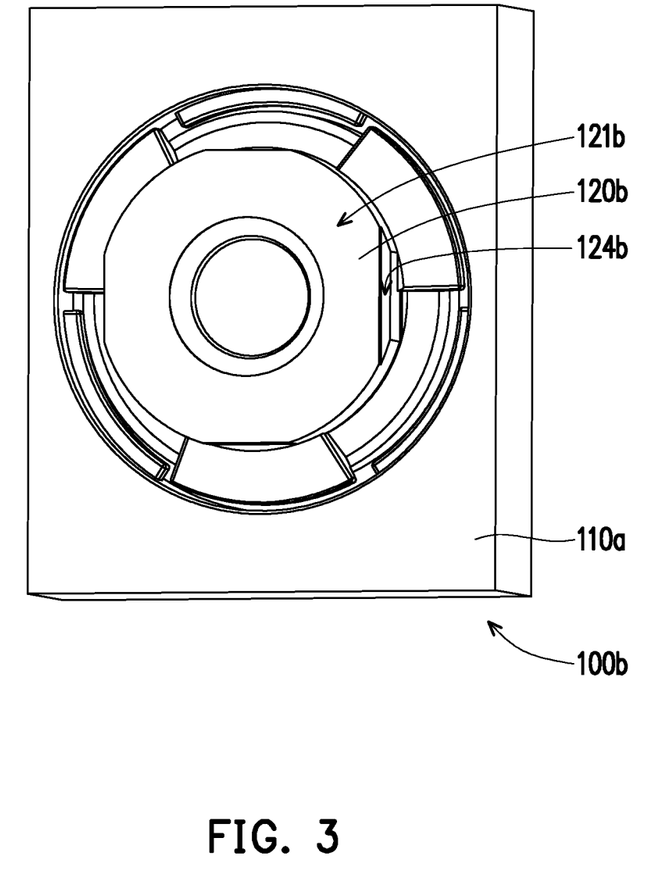
FIG. 3 is a schematic three-dimensional top view of a lens structure according to an embodiment of the invention.

FIG. 3 is a schematic three-dimensional top view of a lens structure according to an embodiment of the invention. With reference to FIG. 1A and FIG. 3, the lens structure 100b provided in the present embodiment is similar to the lens structure 100a depicted in FIG. 1A, while the difference therebetween lies in that the lens 120b of the lens structure 100b provided herein further includes a fool-proof notch 124b located on the first upper surface 121b of the lens 120b. The fool-proof notch 124b allows users to learn the angle at which the lens 120b rotates, which may serve as a mark or a basis for adjusting images.

Figure 4:
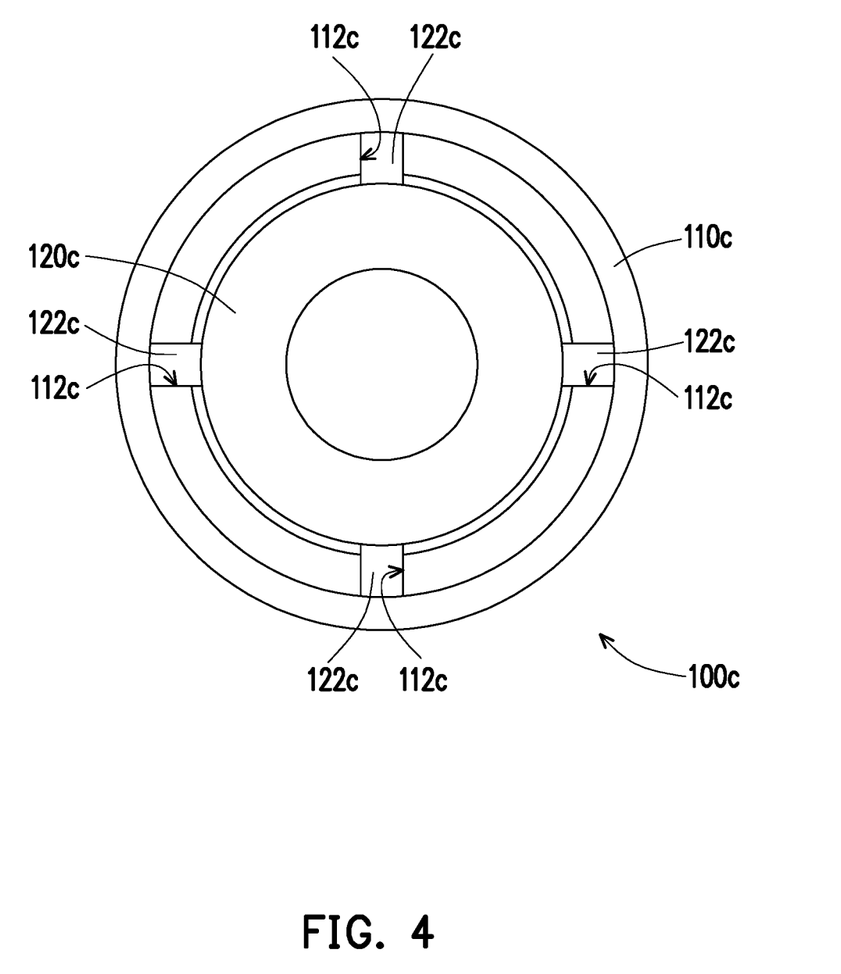
FIG. 4 is a schematic top view of a lens structure according to another embodiment of the invention.

FIG. 4 is a schematic top view of a lens structure according to another embodiment of the invention. With reference to FIG. 1A and FIG. 4, the lens structure 100c provided in the present embodiment is similar to the lens structure 100a depicted in FIG. 1A, while the difference therebetween lies in that the lens barrel 110c of the lens structure 100c provided herein includes four first locking structures 112c, and the lens 120c is disposed in the lens barrel 110c and includes four second locking structures 122c. The first locking structures 112c are respectively locked to the second locking structures 122c, so that the lens 120c is fixed to the lens barrel 110c. Herein, the first locking structures 112c are embodied as grooves, and the second locking structures 122c are embodied as bumps, which should however not be construed as limitations in the disclosure.

To sum up, in the design of the lens structure provided herein, the first locking structures are respectively locked to the second locking structures, so that the lens is fixed to the lens barrel. According to the related art, the lens and the lens barrel are fixed to each other through adhesion. By comparison, the lens and the lens barrel of the lens structure provided herein are not directly adhered to each other; instead, the lens and the lens barrel are preliminarily fixed to each other by the rotatable locking structures, and the adhesive in the structures are then applied to adhere the lens and the lens barrel. Thereby, the lens structure provided herein has favorable structural strength and reliability. Besides, the lens and the lens barrel of the lens structure provided herein are fixed to each other by the rotatable locking structures, and therefore the assembly process has more flexibility.

It will be apparent to those skilled in the art that various modifications and variations can be made to the structure of the disclosure without departing from the scope or spirit of the disclosure. In view of the foregoing, it is intended that the disclosure cover modifications and variations provided they fall within the scope of the following claims and their equivalents.

What is claimed is:

1. A lens structure comprising:
a lens barrel comprising at least two first locking structures; and
a lens disposed in the lens barrel from bottom to top and comprising at least two second locking structures, wherein the lens has a first upper surface, a first side surface, at least two protrusions, a second side surface, and a second upper surface, the first side surface is vertically connected to the first upper surface, each of the at least two protrusions has an inclined surface and a bottom surface, the inclined surface inclines downwardly from the first side surface to a side away from the first side surface, the second side surface is vertically connected between the bottom surface and the second upper surface, and the at least two protrusions and the second upper surface define the at least two second locking structures, the at least two first locking structures are respectively locked to the at least two second locking structures by rotating the lens, so that the lens is fixed to the lens barrel.

2. The lens structure as recited in claim 1, wherein the lens further comprises a fool-proof notch located on the first upper surface of the lens.

3. The lens structure as recited in claim 1, further comprising:
an adhesive at least disposed between the lens and the lens barrel.

4. An assembly method of a lens structure, comprising:
providing a lens barrel and a lens, the lens barrel comprising at least two first locking structures, the lens comprising at least two second locking structures, wherein the lens has a first upper surface, a first side surface, at least two protrusions, a second side surface, and a second upper surface, the first side surface is vertically connected to the first upper surface, each of the at least two protrusions has an inclined surface and a bottom surface, the inclined surface inclines downwardly from the first side surface to a side away from the first side surface, the second side surface is vertically connected between the bottom surface and the second upper surface, and the at least two protrusions and the second upper surface define the at least two second locking structures;

arranging the lens to pass the lens barrel from bottom to top and to be disposed in the lens barrel; and rotating the lens, such that the at least two first locking structures are respectively locked to the at least two second locking structures, and the lens is fixed to the lens barrel.

5. The assembly method of the lens structure as recited in claim 4, wherein after the step of rotating the lens, the assembly method of the lens structure further comprises:

filling a space between the lens and the lens barrel with an adhesive; and curing the adhesive.

6. The assembly method of the lens structure as recited in claim 4, wherein after the step of rotating the lens, the assembly method of the lens structure further comprises:

measuring an optical performance parameter of the lens through an optical instrument and adjusting a rotation angle of the lens according to the optical performance parameter.

7. The assembly method of the lens structure as recited in claim 4, wherein the lens further comprises a fool-proof notch located on the first upper surface of the lens.

* * * * *